United States Patent [19]

Montbriand et al.

[11] Patent Number: 5,347,508

[45] Date of Patent: Sep. 13, 1994

[54] OPTICAL INFORMATION STORAGE DISK FOR USE WITH ELECTRONIC ARTICLE SURVEILLANCE SYSTEMS

[75] Inventors: David P. Montbriand, Hudson, Wis.; Peter J. Zarembo, Shoreview, Minn.

[73] Assignee: Minnesota Mining and Manufacturing Company, St. Paul, Minn.

[21] Appl. No.: 872,151

[22] Filed: Apr. 22, 1992

[51] Int. Cl.$^5$ .................... G11B 7/24; G08B 13/08
[52] U.S. Cl. ....................... 369/273; 340/572; 369/292
[58] Field of Search ............. 369/273, 289, 290, 292; 360/135, 137; 340/572

[56] References Cited

U.S. PATENT DOCUMENTS

| | | | |
|---|---|---|---|
| 4,692,746 | 9/1987 | Budin et al. | 340/572 |
| 4,709,813 | 12/1987 | Wildt | 206/312 |
| 4,710,754 | 12/1987 | Montean | 340/572 |
| 4,794,470 | 12/1988 | Lauffenberger et al. | 360/133 |
| 4,910,625 | 3/1990 | Albrecht et al. | 360/135 |
| 4,967,185 | 10/1990 | Montean | 340/572 |
| 5,012,380 | 4/1991 | Harissis et al. | 360/135 |
| 5,081,446 | 1/1992 | Gill et al. | 340/572 |

Primary Examiner—Stuart S. Levy
Assistant Examiner—Paul J. Ditmyer
Attorney, Agent, or Firm—Gary L. Griswold; Walter N. Kirn; Kari H. Bartingale

[57] ABSTRACT

An optical information storage disk especially adapted for tamper-proof monitoring by an electronic article surveillance (EAS) system. The compact disk hereof includes a generally planar, annular first disk surface and an opposed, generally annular second disk surface, a plurality of generally concentric data tracks on at least one of the disk surfaces, a centered aperture and a generally annular EAS magnetic marker concentrically oriented about the centered aperture. The annular EAS marker comprises a dual status, multi-directional marker with a selectively demagnetizable, essentially linear magnetic switching field. The marker is preferably received within a grooved recess in one of the disk surfaces and is immovably retained within the grooved recess by a coating covering the disk surface.

6 Claims, 1 Drawing Sheet

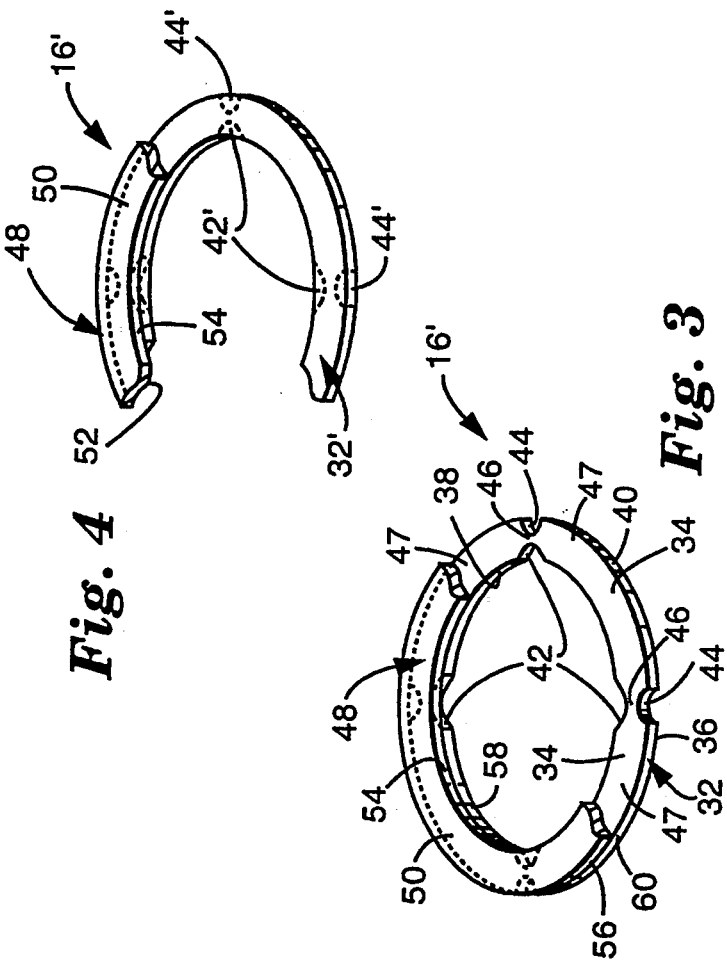
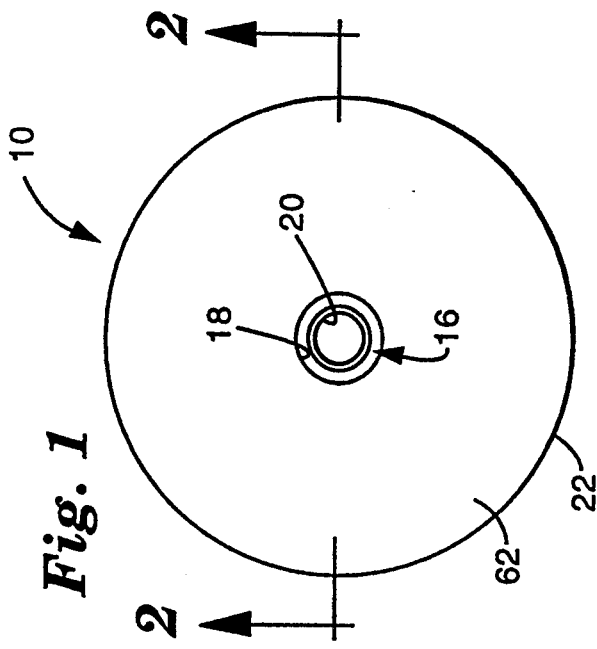
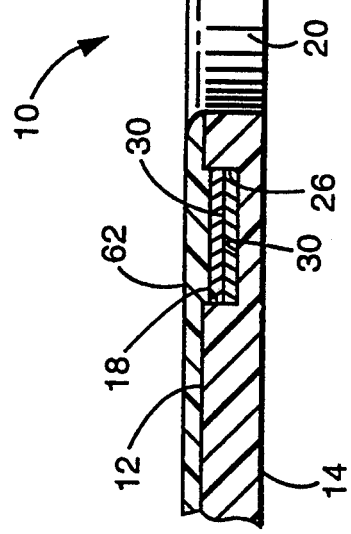
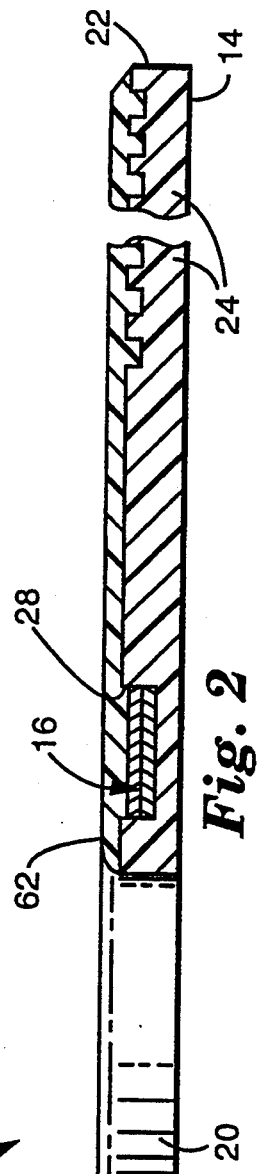

OPTICAL INFORMATION STORAGE DISK FOR USE WITH ELECTRONIC ARTICLE SURVEILLANCE SYSTEMS

TECHNICAL FIELD

This invention relates in general to data storage disks for encoding data in optically detectable, generally concentric data tracks. In particular, it relates to compact optical information storage disks especially adapted for use with an electronic article surveillance (EAS) system.

BACKGROUND OF THE INVENTION

The now familiar compact disk preserves information as a series of microscopic pits and smooth areas, oriented in concentric circular or helical tracks, on the otherwise smooth, planar surface of an annular disk. Recorded information is read from a compact disk by directing a focused laser beam along the recorded tracks, and detecting variations in the intensity of the laser beam as it encounters the microscopic pits and smooth areas on the disk. The coherence and relatively short wavelength of laser radiation enables large volumes of information to be written onto very small spaces of a recording medium.

Compact disks were first introduced in the music recording industry in 1982, and now account for 43% of all recorded music sales. In the United States alone, over three hundred million compact disks are sold annually, with a retail value of over three billion dollars, according to the Recording Industry Association of America.

The recording industry has for the last ten years packaged the five inch in diameter prerecorded compact disks in six inch by twelve inch cardboard boxes known in the industry as "longboxes." The longbox is easily propped up in display bins alongside traditional vinyl LPs in music store display bins. More importantly, however, the bulk of the longbox makes it difficult for a shoplifter to hide a prerecorded compact disk under a coat or in a purse and walk out of a music store without paying.

While the longbox packaging technique for prerecorded compact disks has been somewhat effective as an anti-theft device, the excess packaging it creates accounts for as much as twenty five million pounds of packaging waste annually. The Recording Industry Association of America accordingly announced in 1991 its intention to abandon the longbox. In February of 1992, the Association announced that, beginning in April 1993, all prerecorded compact disks would be marketed in five inch by five and one half inch packages.

Electronic article surveillance systems for monitoring the egress of sensitive objects from controlled spaces are well known, and have been used alone and along with the longbox packaging technique for controlling the unauthorized taking of compact disks. Markers formed from a piece of high permeability magnetic material can be placed on the packaging for the disk. Spaced apart detection panels are then placed across the access points to and from the store, library or other repository for the monitored compact disks. The panels include field coils and detector coils for producing a magnetic field across the access point that can detect the passage of a marker between the panels. If a person attempts to carry a compact disk through the magnetic field presented by the panels without first deactivating the marker on the disk packaging, the presence of the marker will be detected and an alarm initiated.

U.S. Pat. No. 4,710,754 discloses a multi-directional EAS marker especially designed for its compact dimensions. The marker disclosed in the '754 patent is comprised of a high permeability, low coercive force, generally planar magnetic responder material that includes at least two narrow regions defining switching sections, and adjacent, wider, flux collector sections. The juxtaposition of the narrow switching sections with the flux collector sections causes the flux to be highly concentrated in the switching sections. The high concentration of flux lines in the switching sections produces high frequency harmonics when passed through an alternating magnetic field, allowing the presence of the marker in the field to be detected. The marker is conveniently made dual status, i.e., reversibly deactivatable and reactivatable, by including a piece of remanently magnetizable material adjacent each of the switching sections. The remanently magnetizable material, when magnetized, biases the adjacent switching section to either keep the magnetization therein from reversing when in an alternating interrogation field, or at least altering the response of the marker in the field. In either case, readily distinguishably different signals are produced by the marker in an interrogation field depending on whether the remanently magnetizable material is magnetized or demagnetized.

U.S. Pat. No. 4,967,185 discloses a multi-directional, dual-status EAS marker also designed for its compact dimensions. The marker disclosed in the '185 patent discloses a marker that includes a continuous uninterrupted sheet of remanently magnetizable material overlying a sheet of responder material similar to that disclosed in the '754 patent. The response of the marker within an alternating magnetic field can be discernably altered by selectively magnetizing and demagnetizing the continuous sheet of remanently magnetizable material prior to introducing the marker into the field.

The markers disclosed in the above noted prior art can be attached to the packaging for a compact disk. Problems arise, however, when attempting to attach prior art markers directly to the surface of a compact disk. Rotation of the compact disk is required to read information from the disk, and the disk must accordingly be inherently balanced. An EAS marker, applied directly to a compact disk, therefor, would preferably be somehow concentrically mounted on the disk without imbalancing the disk. Prior art EAS markers, however, are not inherently balanced. Moreover, conventional compact disks include a centered aperture that must be maintained clear of obstructions, and the preferred prior art dual status EAS markers include a continuous sheet of magnetic material, such that the marker cannot be concentrically mounted to the surface of a compact disk without obstructing the disk aperture.

U.S. Pat. No. 4,709,813 proposed an anti-theft device for compact disks that overcame the inability to directly apply an EAS marker to the surface of a compact disk. The '813 patent discloses a detachable locking plate with an EAS marker carried on the internal face of the plate that can be selectively locked to the "jewelry box" for a compact disk. The compact disk is physically locked in the box leg by the plate. A clerk or other authorized person can remove the plate with the use of a keyed release tool at the time of payment. It will be appreciated that the use of a locking plate requires preparation time to attach a plate to each compact disk cartridge, adds an additional step in the check-out process, and leaves the compact disk without EAS protection once the EAS marker carrying plate is removed from the compact disk. The lack of EAS protection once the plate is removed makes it especially risky for a retailer to permit the trial playing of a compact disk by a customer in the store before the compact disk is purchased.

The new packaging standard for prerecorded compact disks, while environmentally sound, will exacerbate the problem of compact disk shoplifting, since the smaller packages will be easier to hide and transport out of a store. While the use of electronic article surveillance systems could partially compensate for the increased shoplifting threat, it will be appreciated that the unauthorized removal of the magnetic markers from a package will defeat the detection capability of the surveillance system, and known EAS markers cannot be directly mounted on a compact disk without affecting the operability of the disk. The use of an EAS marker in conjunction with a locking plate presents handling problems and does not solve the problem of physical security of compact disks at stores where the customer is allowed to listen to the compact disk prior to purchase. A new, compact optical information disk especially designed for tamper-proof use with an electronic article surveillance system through the use of an EAS marker that could be applied directly to the surface of the compact disk would accordingly provide decided advantages.

SUMMARY OF THE INVENTION

The compact, optical information storage disk in accordance with the present invention is especially adapted for tamper-proof monitoring by an electronic article surveillance system. The compact disk hereof includes a generally planar, annular first disk surface and an opposed, generally annular second disk surface oriented generally parallel to the first disk surface, a plurality of generally concentric data tracks on at least one of the disk surfaces, a centered aperture and a generally annular magnetic marker concentrically oriented about the centered aperture. The marker is preferably adhered to the bottom of a grooved recess presented by one of the disk surfaces, and is thereafter immovably retained in the recess by a coating covering the disk surface.

The EAS marker hereof includes a first annular member formed from a high permeability, low coercive force ferromagnetic material having a plurality of magnetic switching areas into which flux collected from adjacent areas is concentrated, thereby enabling a characteristic, readily distinguishable response to be created upon reversal of the magnetic state within at least one switching area when the marker is placed within an alternating magnetic field forming an interrogation zone. Preferably, the width of the first annular member is restricted at at least two locations positioned approximately at ninety degrees with respect to each other about the annulus to present at least two narrow switching regions alternating with wider flux collecting regions. The generally orthogonal relative orientation of the switching sections provides for multi-directional detection of the EAS marker in the alternating magnetic interrogation field. The marker further includes a second annulus member overlying the first member, and formed from a relatively high coercive force ferromagnetic material which, when magnetized, for example, in a single, linear direction, notwithstanding the annular shape of the member, alters the characteristic response of the marker when in the interrogation zone from the response resulting when the second member is demagnetized, thereby providing for the selective activation and deactivation of the EAS marker.

The optical information storage disks hereof are designed to be stored in an access controlled space, with entrance and egress to the space directed only through the magnetic field established by the panels of an electronic article surveillance system. Passage of a disk through the panels will initiate an alarm, unless either the marker or the magnetic field is deactivated. The magnetic markers of the security cartridges are desirably made essentially tamper proof by applying a sealing compound, such as a lacquer coating, over the marker on the surface of the disk. Other layers or sealing techniques may also be employed to prevent removal.

BRIEF DESCRIPTION OF THE DRAWINGS

FIG. 1 is a top planar view of an optical information storage disk in accordance with the present invention;

FIG. 2 is a fragmentary, sectional view taken along line 2—2 of FIG. 1;

FIG. 3 is an enlarged, perspective view of the magnetic marker in accordance with the present invention; and FIG. 4 is an enlarged, perspective view of an alternative embodiment of the magnetic marker in accordance with the present invention.

DETAILED DESCRIPTION OF THE INVENTION

Referring to the drawings, an optical information storage disk 10 in accordance with the present invention broadly includes a generally planar, annular first disk surface 12, an opposed, annular second disk surface 14 oriented generally parallel to the first disk surface 12, and an annular magnetic marker 16 carried within an annular groove 18 in the first disk surface 12. Centered aperture 20 and circular peripheral rim 22 extend between the first surface 12 and second surface 14. The magnetic marker 16 is concentrically oriented about the centered aperture 20.

Information tracks 24 are made up of microscopic pits and smooth areas on the disk first surface 12. The tracks 24 can be either circular or helical and are concentrically oriented about the centered aperture 20.

As shown in more detail in FIG. 2, the annular groove 18 presents a generally cylindrical groove inner wall 26, an opposed generally cylindrical groove outer wall 28, and a generally annular bottom 30 extending between the groove inner wall 26 and outer wall 28. The groove inner wall 26 and outer wall 28 are both oriented generally normal to the first disk surface 12. The groove bottom wall 30 is recessed from, and oriented generally parallel to, the first disk surface 12.

Magnetic marker 16 includes a first annulus member 32 formed from a high permeability, low coercive force ferromagnetic material such as permalloy, supermalloy, or the like. The annulus member 32 has an upper surface 34, a lower surface 36, an inner peripheral rim 38, and an outer peripheral rim 40.

Four internal notches 42 are formed on the internal peripheral rim 38 of the annulus 32. The notches 42 are spaced apart at approximately ninety degree intervals along the rim 40. Four external notches 44 are formed in the outer peripheral rim 40 of the annulus member 32 in opposed relationship with the internal notches 42. The opposed pairs of notches 42, 44 define regions of reduced cross sectional area 46 along the annulus 32. Flux collection regions 47 are created between the areas 46.

A second annulus member 48 is adhesively coupled to, and is substantially coextensive with, the first annulus member 32. The second annulus member 48 is formed from a sheet of relatively high coercive force ferromagnetic material such vicalloy, magnetic stainless steel, Chromendur II, or the like. The annulus member 48 includes an upper surface 50, an opposed, lower surface 52 adhesively bonded to the upper surface 34 of the first annulus member 32, an inner peripheral rim 54 generally co-extensive with the inner rim 38 of the first annulus member 38, and an outer rim 56 co-extensive with the outer rim 40 of the first annulus member 32.

The inner rim 38 of the first annulus member 32 and the inner rim 54 of the second annulus member 48 present a marker inner rim 58. Referring to FIG. 2, the groove inner diameter presented by groove inner wall 26 is matched to the inner diameter presented by marker rim 58 such that the marker 16 is self-centered about the centered aperture 20 of disk 10 by the engagement of the inner rim 58 of marker 16 with the groove inner wall 26, while avoiding force fitting the marker, which could place mechanical stress on the marker. The outer rim 40 of first annulus member 32 and outer rim 56 of annulus member 48 define a marker outer rim 60. The groove outer diameter presented by groove outer wall 28 is similarly matched to the outer diameter of marker 16 presented by marker outer rim 60 such that the marker 16 is also self-centered about the disk centered aperture 20 by engagement of the marker outer peripheral rim 60 with the groove outer wall 28.

The magnetic marker 16 can be retained within the groove 18 by an adhesive bond applied between the lower surface 34 of annulus member 32 and the groove bottom wall 30. A coating 62, such as a lacquer finish, applied to and carried by the first disk surface 12 is received within the groove 18, and immovably positions the magnetic marker 16 within the groove 18.

An alternate embodiment of the marker 16' is depicted in FIG. 4. The marker 16' is similar in many respects to the marker 16, and identical features between the two markers are annotated with identical numbers in the drawings, and similar but not identical features are indicated in FIG. 4 with primed (') numbers. In this embodiment, the switching sections of the marker 16' are not created by physically removing material from the first annulus member 32'. Rather, the "notches" 42', 44' are formed by physically striking the annulus 32' at the points where the "notches" 42, 44 are desired, or by otherwise work hardening the annulus 32' at the desired points. In this way, the permeability of the material at those points is lowered so that the material can no longer magnetically reverse rapidly enough to create a characteristic response.

In use, the marker 16 can be magnetically switched between a first state wherein it is responsive to a magnetic interrogation field to initiate an alarm as it is passed through the field, and a second state wherein it is unresponsive to the interrogation field. The marker 16 is switched between an active and deactive state by uniformly magnetizing and demagnetizing the second annulus member 48 of the marker 16. More particularly, the marker 16 is reliably switched from a first, active state into a second, deactivated state, by substantially uniformly magnetizing the magnetizable member 48 so as to exhibit a first magnetic polarity along one end of the member 48 and an opposite polarity at the opposite end of the member 48. This essentially linear polarization is opposed to the generally annular physical shape of the member 48. It will be appreciated that the marker 16, although of relatively small size, provides a readily distinguishable response because of the presence of flux collector regions 47 presented by the pairs of opposed notches 42, 44 of the first annulus member 32 of marker 16.

The optical information storage disk 10 can be kept in an access controlled space, such as the display space of a retail store having entrance and egress to the space directed only through the magnetic field established by the panels of an electronic article surveillance system. The disks 10 would be stored with their magnetic markers 16 in the active state such that removal of a disk from the store, through the magnetic field, would set off an alarm. Upon proper check out of a disk 10 with a clerk, however, the clerk would deactivate the marker 16 such that its passage through the magnetic field would not initiate an alarm.

The coating 62 effectively immovably seals the marker 16 within the groove 18 without hindering the readability of the data tracks 24 on the disk 10, since it would be difficult or impossible to remove the marker 16 without damaging the disk. Excess packaging techniques, such as use of the "longbox," can accordingly be dispensed with, without undesirably increasing the chance of unauthorized removal of a disk from a controlled space.

While the marker 16 (and the alternative embodiment of the marker 16') disclosed herein has been especially adapted for use with compact disks, it will be appreciated that the unique shape and magnetic orientation of the marker 16 make it adaptable to other applications. For instance, the small size and annular shape of the marker 16 make it ideal for insertion into the cap of a container for pharmaceuticals, thereby providing for EAS monitoring of heretofore pilferable prescription and nonprescription drugs.

We claim:

1. An optical information disk of the type comprising a generally planar, generally annular first disk surface and an opposed, generally annular second disk surface oriented generally parallel to said first disk surface, an outer, generally circular peripheral rim extending between said first and second disk surfaces and structure defining a generally centered aperture extending between said first and second disk surfaces and a plurality of generally concentric data tracks optically accessible from at least one of said disk surfaces, wherein said disk is further adapted for use with a magnetic electronic surveillance system to prevent unauthorized removal of said disk from an access restricted location, said disk further comprising a generally annular, magnetic electronic surveillance marker carried about said aperture and means for securing said marker to said disk without impairing the operability of said disk, wherein said disk includes structure defining a groove in said first disk surface including a generally cylindrical groove inner wall oriented generally normal to said first disk surface, an opposed, generally cylindrical groove outer wall oriented generally normal to said first disk surface, and a generally annular bottom wall oriented generally parallel to said first disk surface extending between said inner and outer groove walls and wherein said marker is positioned within said groove.

2. A disk according to claim 1, said marker including a generally annular marker upper surface and an opposed, generally annular marker lower surface, said securing means including adhesive means for adhering said marker lower surface to said groove bottom wall.

3. A disk according to claim 1, said securing means including a sealing compound applied across said first surface and bondingly received within said groove for immovably sealing said marker in said groove.

4. A disk according to claim 3, said sealing compound comprising a lacquer coating.

5. A disk according to claim 1, wherein said marker comprises:
   (a) a first annulus of a high permeability, low coercive force material having a plurality of magnetic switching areas into which flux collected from adjacent areas is concentrated, thereby enabling a characteristic, readily distinguishable response to be created upon reversal of the magnetic state within at least one switching area.

6. A disk according to claim 5, wherein said marker further comprises a second annulus substantially coextensive with said first annulus and formed of a relatively high coercive force material which, when magnetized, alters said characteristic response from that resulting when unmagnetized.

* * * * *